US012667124B2

(12) United States Patent
Rosen et al.

(10) Patent No.: US 12,667,124 B2
(45) Date of Patent: Jun. 30, 2026

(54) METHODS FOR DETOXIFYING BRAN AND PRODUCTS OBTAINED THEREFROM

(71) Applicants: Barry P. Rosen, Miami, FL (US); Jian Chen, Miami, FL (US)

(72) Inventors: Barry P. Rosen, Miami, FL (US); Jian Chen, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 19/058,805

(22) Filed: Feb. 20, 2025

(65) Prior Publication Data

US 2026/0174112 A1 Jun. 25, 2026

Related U.S. Application Data

(62) Division of application No. 18/988,015, filed on Dec. 19, 2024.

(51) Int. Cl.
*A23L 7/104* (2016.01)
*A23L 5/20* (2016.01)
*A23L 7/10* (2016.01)

(52) U.S. Cl.
CPC ................ *A23L 7/107* (2016.08); *A23L 5/25* (2016.08); *A23L 7/115* (2016.08)

(58) Field of Classification Search
CPC ............ A23L 7/107; A23L 7/115; A23L 5/25
See application file for complete search history.

(56) References Cited

PUBLICATIONS

English translation of CN-103549234-A Chen Y Feb. 5, 2014 (Year: 2014).*
Angstone Thembachako Mlangeni "Methylation of arsenic in rice: Mechanisms, factors, and mitigation strategies" Toxicol Rep. Sep. 25. 2023; 11:295-306. https://pmc.ncbi.nlm.nih.gov/articles/PMC10543780/ (Year: 2023).*
Ajees, A. Abdul et al. "The structure of an As(III) S-adenosylmethionine methyltransferase: insights into the mechanism of arsenic biotransformation." Biochemistry 51(27):5476-5485, Jul. 10, 2012.
Sun-Guo-Xin et al. "Inorganic arsenic in rice bran and its products are an order of magnitude higher than in bulk grain." Environ Sci Technol., 42(19):7542-7546, Abstract, Oct. 1, 2008.

* cited by examiner

*Primary Examiner* — Katherine D Leblanc
(74) *Attorney, Agent, or Firm* — SALIWANCHIK, LLOYD & EISENSCHENK

(57) ABSTRACT

The subject invention provides a bran composition comprising a bran component with a reduced level of inorganic arsenic, a grain product that comprises such bran composition and at least one other component and/or other ingredient, and food products that are made from such bran composition and/or such grain product. The subject invention also provides methods of detoxifying a bran and/or grain product.

20 Claims, 5 Drawing Sheets

METHODS FOR DETOXIFYING BRAN AND PRODUCTS OBTAINED THEREFROM

CROSS-REFERENCE TO RELATED APPLICATION

The present application is a divisional application of U.S. application Ser. No. 18/988,015, filed Dec. 19, 2024, the disclosure of which is hereby incorporated by reference in its entirety, including all figures, tables, and drawings.

BACKGROUND

The Agency for Toxic Substances and Disease Registry has reported that arsenic ranks first on the U.S. EPA Superfund List of Hazardous Substances (www.atsdr.cdc.gov/spl/). Environmental arsenic includes, but is not limited to, the following species:

As(III)

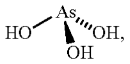

As(V)

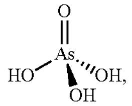

Roxarsone

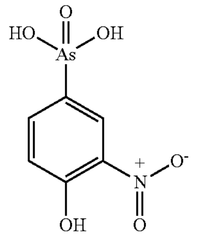

DMAs(V)

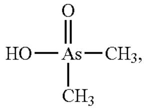

and

MAs(V)

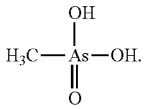

Adverse health effects that arsenic may bring to organ systems include: (1) skin: hyperkeratosis of palms and soles, melanosis or depigmentation, basal cell carcinoma, and squamous cell carcinoma; (2) liver: enlargement, jaundice, cirrhosis, and non-cirrhotic portal hypertension; (3) nervous system: peripheral neuropathy, and hearing loss; (4) cardiovascular system and bladder: peripheral vascular disease, and bladder cancer; (5) respiratory system: lung cancer; and (6) endocrine system: diabetes mellitus and goiter.

As the most widely consumed staple food world-wide, rice is the primary dietary source of arsenic. The rice kernel is composed of a brown outer layer termed the bran and the endosperm, the large, white interior of the rice grain. The endosperm is approximately 70% of the kernel by weight, and the bran is approximately 8%. The embryo or germ is about 2%, and the inedible hull is about 20%. Removing the hull produces edible brown rice, and removing the bran leaves white rice.

Rice bran is a rich source of protein, fat, dietary fibers, vitamins, minerals, and phytochemicals (mainly oryzanols and tocopherols), and thus has been widely used for baby food, nutritional supplements, animal feed and other rice products. Commercial rice bran is usually stabilized to increase the shelf life by treatment with heat and thermophilic enzymes to prevent fatty acid oxidation and to extract essential nutrients (stabilnutrition.com/rice-bran/).

Rice is a natural arsenic accumulator that is high in toxic inorganic arsenic, which is cardiotoxic, neurotoxic and carcinogenic. The rice grain accumulates up to 10-fold more arsenic than other food crops. Whole grain (brown) rice contains much more total arsenic than polished (white) rice.

US rice is highly contaminated with arsenic, with the amount of total arsenic contained in market rice reported to be in the range of about 0.2-0.3 μg/g (P N Williams et al., *J. Environ Sci Technol,* 2005 Aug. 1; 39 (15): 5531-40). The source of arsenic taken up by the rice plant is primarily from the water supply, although sources of anthropogenic arsenic include its use as a herbicide and pesticide in Southwest USA.

Elemental analysis of arsenic in the grain shows that the majority of toxic inorganic arsenic is located in the bran; in contrast, nontoxic organic dimethylarsenate (DMAs(V)) is located in the endosperm (Matt A. Limmer et al., *J. Scientific Reports,* 25 Mar. 2022, 12 (1): 5210). Such results suggest that the majority of the inorganic arsenic in the edible portion of the rice grain is in the bran.

The U.S. Food and Drug Administration (FDA) has identified inorganic arsenic as danger to humans, in particular, to fetuses, infants and children, but did not consider methylated arsenic in rice bran to be a concern. The FDA states that reducing exposure to inorganic arsenic from rice and rice products can reduce the lifetime risk of cancer. In particular, eliminating rice grain and rice products from the diet during infancy (<1 year) and childhood (0-6 years) would potentially reduce the lifetime risk of cancer for the U.S. population from exposure to inorganic arsenic in rice and rice products by approximately 6% and 23%, respectively. Because baby food and other bran-related rice products expose children to high levels of arsenic, the FDA recommends that a dietary change away from inorganic arsenic-containing rice products could reduce the risk of non-cancer adverse health effects on rapid brain development in children.

Thus, there is a need to develop improved grain and/or bran products, especially a rice bran product, having a lowered level of inorganic arsenic. There is also a need for developing novel strategies for detoxifying a grain and/or bran product, especially a rice bran product, by reducing the inorganic arsenic contained therein.

BRIEF SUMMARY

The subject invention provides a safe and improved bran and/or grain product that comprises minimal levels of toxic inorganic arsenic. The subject invention also provides methods for producing a safe and improved bran and/or grain product that comprises minimal levels of toxic inorganic arsenic.

Specifically, according to the present invention, the amount of inorganic arsenic in bran, such as rice bran, can be greatly reduced by enzymatic methylation of the inorganic arsenic into much less toxic pentavalent dimethylarsenate (DMAs(V)). Thus, such process may be used to produce safer bran products and reduce the adverse developmental effects of consumption of arsenic-containing food (e.g., baby food), as well as reduce the carcinogenic effects of bran-containing dietary supplements and produce healthier animal feed.

In some embodiments, the present invention provides a bran composition comprising a bran component with a reduced level of inorganic arsenic, wherein the bran composition is a detoxified bran composition, and the reduced level of inorganic arsenic is achieved relative to an undetoxified bran composition.

In certain embodiments, the bran component is selected from a rice bran component, corn bran component, wheat bran component, oat bran component, barley bran component, rye bran component, and millet bran component. In certain embodiments, the amount of the bran component is at least about 60% of the bran composition by weight; and/or the bran composition has a level of inorganic arsenic reduced by at least about 70% relative to an undetoxified bran composition; and/or the bran composition has up to about 0.40 mg/kg of inorganic arsenic by weight.

In one embodiment, the bran composition has been detoxified by a method comprising creating a bran slurry and methylating the inorganic arsenic in the slurry with an arsenic S-adenosylmethionine (SAM) methyltransferase. In specific embodiments, the arsenic SAM methyltransferase is a heat-stable enzyme from a microbe (e.g., arsenite S-adenosylmethyltransferase (ArsM)).

In a specific embodiment, the arsenic SAM methyltransferase is the heat-stable enzyme CmArsM (accession number ACN39191), which is from an environmental isolate of the acidothermoacidophilic eukaryotic red alga Cyanidioschyzon merolae from Yellowstone National Park and catalyzes arsenic methylation and volatilization.

In some embodiments, the present invention provides a grain product that comprises the bran composition as described herein. In preferred embodiments, the bran composition comprises a bran component with a reduced level of inorganic arsenic, and optionally, at least one other component and/or ingredient.

In certain embodiments, the other component is selected from an endosperm component and a germ component. In certain embodiments, the other ingredient is selected from flavorings, oils, emulsifiers, preservatives, colorants, texturizers, and functional additives.

In certain embodiments, the grain product is a dry product that contains up to about 25% water or other solvent, or is substantially free of water or other solvent, or is anhydrous.

In some embodiments, the present invention provides a food product that is made from the bran composition and/or the grain product as described herein. In certain embodiments, the food product is provided by further treating the bran/grain, the bran composition and/or the grain product as described herein with at least another heat-stable enzyme, including but not limited to, proteases and lipases.

In certain embodiments, the food product is a bakery product selected from cookies, crackers, pizza crusts, pie crusts, breads, bagels, pretzels, brownies, muffins, waffles, pastries, cakes, quick breads, sweet rolls, donuts, fruit and grain bars, tortillas, and parbaked bakery products. In certain embodiments, the food product is an un-baked product selected from noodles, pasta, grain-based ice cream, and grain-based protein powder. In specific embodiments, the food product is a baby food, a dietary supplement, or an animal food.

In one embodiment, the present invention provides a method of detoxifying a bran composition, the method comprising the following steps:

(1) Creating a slurry by suspending the bran composition in a buffer solution; and (2) Methylating inorganic arsenic in the slurry by treating the slurry with at least one methylating enzyme.

In certain embodiments, the bran composition used in this method comprises a bran component with a certain level of inorganic arsenic. In preferred embodiments, the bran composition has at least about 1 mg/kg of inorganic arsenic by weight.

In specific embodiments, the buffer solution used in step (1) is a MOPS buffer solution.

In certain embodiments, step (2) comprises mixing the slurry obtained in step (1) with at least one methylating enzyme. In a preferred embodiment, the methylating enzyme is a heat-stable methylating enzyme. In certain embodiments, the methylating enzyme used in step (2) is an arsenic S-adenosylmethionine methyltransferase, preferably, the arsenic S-adenosylmethionine methyltransferase is CmArsM; and/or step (2) comprises methylating at least about 70% of the inorganic arsenic contained in the slurry obtained from step (1).

In one embodiment, the present invention provides a method of detoxifying a grain product, the method comprising the steps of:

(1) Creating a slurry by suspending the grain product in a buffer solution; and (2) Methylating inorganic arsenic in the slurry by treating the slurry with at least one methylating enzyme.

In certain embodiments, the grain product used in the method comprises a bran composition, wherein the bran composition comprises a bran component with a certain level of inorganic arsenic, and at least one other component and/or ingredient. In a preferred embodiment, the bran composition has at least about 1 mg/kg of inorganic arsenic by weight.

In certain embodiments, the buffer solution used in step (1) is a MOPS buffer solution.

In certain embodiments, step (2) comprises mixing the slurry obtained in step (1) with at least one methylating enzyme, preferably, the methylating enzyme is a heat-stable methylating enzyme. In certain embodiments, the methylating enzyme used in step (2) is an arsenic S-adenosylmethionine methyltransferase, preferably, the arsenic S-adenosylmethionine methyltransferase is CmArsM; and/or step (2) comprises methylating at least about 70% of the inorganic arsenic contained in the slurry obtained from step (1).

In a specific embodiment, the method further comprises a step of drying the treated slurry.

In one embodiment, the subject invention provides a method of detoxifying a grain product, the method comprising mixing the grain product with a buffer solution to create a slurry; adding an arsenic S-adenosylmethionine methyltransferase in the slurry to methylate the inorganic arsenic; and optionally, drying the mixture of the slurry and the arsenic S-adenosylmethionine methyltransferase.

DETAILED DESCRIPTION

Figure 1:
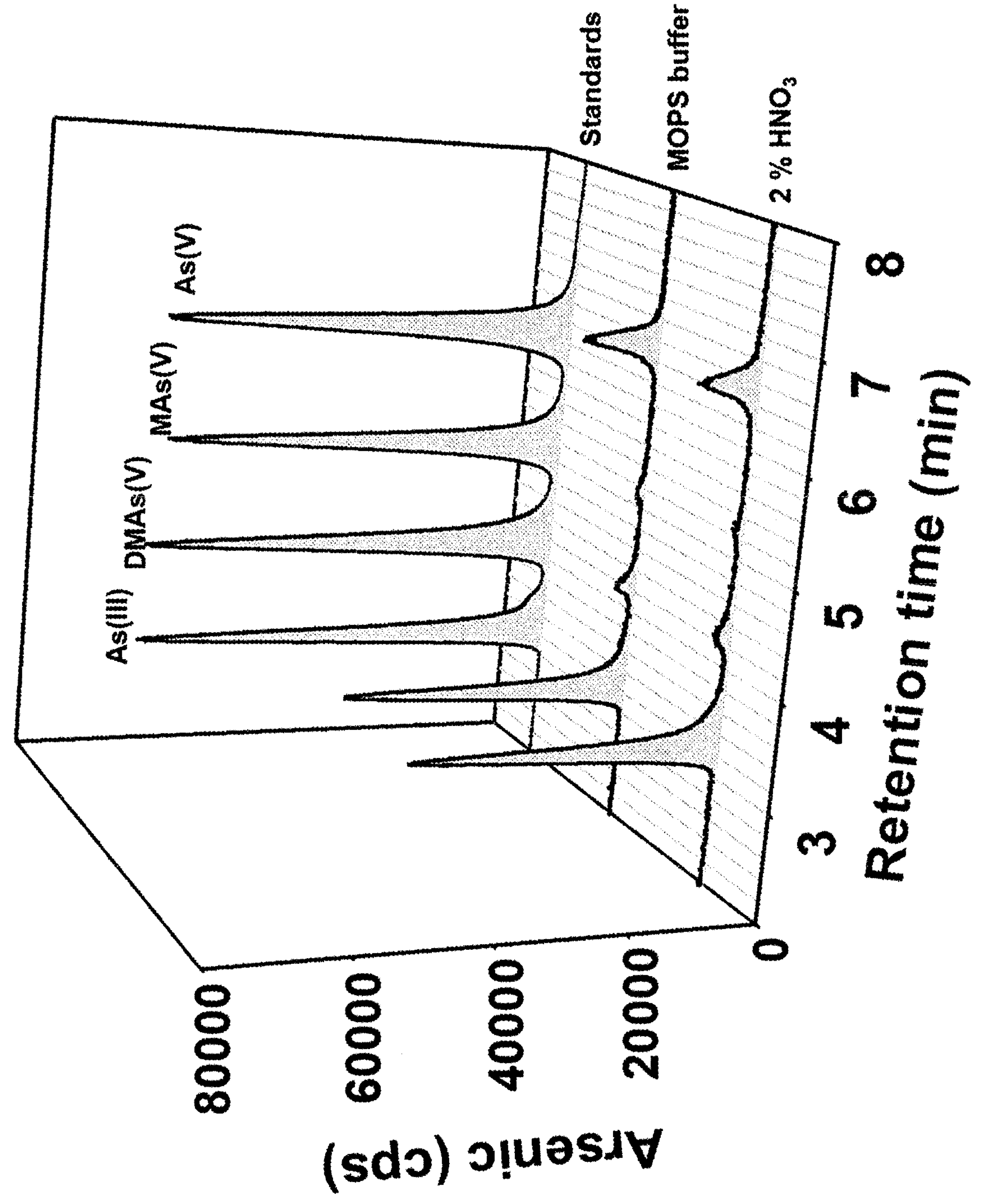
FIG. 1 shows rice bran arsenic species analysis by HPLC-ICP-MS.

Reference now will be made to certain detailed aspects of various embodiments of the invention. It is to be understood that the disclosed embodiments are merely exemplary of the invention that may be embodied in numerous and alternative forms. Therefore, specific details disclosed herein are not to be interpreted as limiting, but merely as a representative basis for any aspect of the invention and/or as a representative basis for teaching one skilled in the art to variously employ the invention. Further, the terminology used herein is used only for the purpose of describing particular embodiments of the present invention and is not intended to be limiting in any way.

Definitions

As used herein, the singular forms "a," "an", and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof) "comprising," "comprises," and "comprise" can be used interchangeably; "consisting essentially of," and "consists essentially of" can be used interchangeably; and "consisting," and "consists" can be used interchangeably.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

Except in the examples, or where otherwise expressly indicated, all numerical quantities in this description indicating amounts of material and/or use are to be understood as modified by the word "about" in describing the broadest scope of the invention. Practice within the numerical limits stated is generally preferred.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0-20%, 0 to 10%, 0 to 5%, or up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed. In the context of compositions containing amounts of concentrations of ingredients where the term "about" is used, these values include a variation (error range) of 0-10% around the value (X±10%).

In the present disclosure, ranges are stated in shorthand to avoid having to set out at length and describe each and every value within the range. Any appropriate value within the range can be selected, where appropriate, as the upper value, lower value, or the terminus of the range. For example, a range of 0.1-1.0 represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, 0.7-1.0, etc. Values having at least two significant digits within a range are envisioned, for example, a range of 5-10 indicates all the values between 5.0 and 10.0 as well as between 5.00 and 10.00 including the terminal values. When ranges are used herein, combinations and subcombinations of ranges (e.g., subranges within the disclosed range) and specific embodiments therein are explicitly included.

Throughout this application, where publications are referenced, the disclosures of these publications in their entireties are hereby referred to in this application to more fully describe the state of the art to which this invention pertains.

The term "whole grain" includes the grain in its entirety, for example as a wheat berry or kernel, prior to any processing. As indicated in the U.S. Food and Drug Administration (FDA) Feb. 15, 2006 draft guidance and as used herein, the term "whole grain" includes cereal grains that consist of the intact, ground, cracked or flaked fruit of the grains whose principal components—the starchy endosperm, germ and bran—are present in the same relative proportions as they exist in the intact grain. The FDA outlined that such grains may include barley, buckwheat, bulgur, corn, millet, flee, rye, oats, sorghum, wheat and wild rice.

The term "cereal" as used herein refers to the fruits from a plant of the family Poaceae, such seed containing at least the bran comprising the aleurone, and the starchy endosperm, with or without the additional presence of pericarp, seed coat (alternatively called testa) and/or germ. The term includes, but is not limited to, species such as wheat, barley, oat, spelt, rye, sorghum, maize (corn), rice, millet, *quinoa*, buckwheat, triticale, and fonio.

The term "bran" refers to the component of a cereal grain consisting of the hard layers—the combined aleurone and pericarp—surrounding the endosperm.

The term "milling" includes the steps of, for example, cutting, rolling, crushing, breaking, screening, blowing, sifting aspirating, and sorting the whole grain to separate it into its constituent parts, which may also result in some reduction of particle size of the constituent parts.

The term "grinding" includes any process directed to reducing particle size, including but not limited to colliding particles against one another or mechanically reducing the particle size.

The term "substantially free" of water or other solvent is used herein to describe a material or substance that is prepared, treated or processed to remove most of the water or other solvent. For example, no more than about 2%, no more than about 1%, no more than about 0.5%, no more than about 0.1%, no more than about 0.01%, or no more than about 0% of the water or other solvent is present in the material or substance.

As set forth above, cereal grain is the primary dietary source of toxic arsenic intakes, and arsenic is much more accumulated in bran than the other parts of the kernel. All of these findings suggest that reducing toxic arsenic levels in bran can be an effective way to detoxify cereal grains. Since arsenic is highly toxic in its inorganic form, detoxification of cereal grains may be achieved by decreasing inorganic arsenic contained therein.

Bran Compositions

The subject invention provides a safe and improved bran product that comprises minimal levels of toxic inorganic arsenic. Specifically, the present invention demonstrates that the amount of inorganic arsenic in bran, such as rice bran, can be greatly reduced by enzymatic methylation of the inorganic arsenic into much less toxic dimethylarsenate (DMAs).

In one embodiment, the present invention provides a bran composition comprising a bran component with a reduced level of inorganic arsenic. In certain embodiments, the bran composition is a detoxified bran composition, wherein the reduced level of inorganic arsenic is achieved relative to an undetoxified bran composition, e.g., a bran composition prior to any detoxification. In certain embodiments, the bran composition is a treated bran composition, wherein the reduced level of inorganic arsenic is achieved relative to an untreated bran composition, e.g., a bran composition prior to any treatment. In certain embodiments, the bran composition is a modified bran composition, wherein the reduced level of inorganic arsenic is achieved relative to an unmodified bran composition, e.g., a bran composition prior to any modification.

In certain embodiments, the bran component can come from various cereal grains, including, but being not limited to, rice, corn, wheat, oat, barley, rye, and millet. Depending on different sources of the bran component, provided herein can be a rice bran composition comprising a rice bran component with a reduced level of inorganic arsenic, a corn bran composition comprising a corn bran component with a reduced level of inorganic arsenic, a wheat bran composition comprising a wheat bran component with a reduced level of inorganic arsenic, an oat bran composition comprising an oat bran component with a reduced level of inorganic arsenic, a barley bran composition comprising a barley bran component with a reduced level of inorganic arsenic, a rye bran composition comprising a rye bran component with a reduced level of inorganic arsenic, or a millet bran composition comprising a millet bran component with a reduced level of inorganic arsenic.

In some embodiments, the bran composition comprises two or more different sourced bran components selected from, for example, a rice bran component, corn bran component, wheat bran component, oat bran component, barley bran component, rye bran component, and millet bran component, the two or more different sourced bran components each independently comprising a reduced level of inorganic arsenic.

In certain embodiments, the bran component can be obtained by milling the cereal grains, and thus is inevitably mixed with components from other parts of the whole grain, such as endosperm and germ. Nevertheless, the bran component should constitute a major portion of the bran composition described herein. In some embodiments, the amount of the bran component is at least about 60%, at least about 65%, at least about 70%, at least about 75%, at least about 80%, at least about 85%, at least about 90%, at least about 95%, at least about 98%, at least about 99%, at least about 99.5%, or at least about 99.9% of the bran composition by weight. In other embodiments, the amount of the bran component is up to about 60%, up to about 65%, up to about 70%, up to about 75%, up to about 80%, up to about 85%, up to about 90%, up to about 95%, up to about 98%, up to about 99%, up to about 99.5%, or up to about 99.9% of the bran composition by weight.

In some embodiments, the amount of the bran component is about 60% or less, about 65% or less, about 70% or less, about 75% or less, about 80% or less, about 85% or less, about 90% or less, about 95% or less, about 98% or less, about 99% or less, about 99.5% or less, or about 99.9% or less of the bran composition by weight. In other embodiments, the amount of the bran component is in a range of, for example, about 50%-100%, about 55%-99%, about 60%-98%, about 65%-95%, about 70%-90%, about 75%-85%, about 80%-90%, about 85%-95% of the bran composition by weight.

In preferred embodiments, the bran composition comprises no other components except for those inevitably introduced into the bran component during production of the bran component. In a preferred embodiment, the bran composition comprises only a pure bran component with no other components.

In certain embodiments, the bran component described herein can be in the form of coarse bran, or fine bran that is ground into various particle sizes. In preferred embodiments, the bran component used herein has an average particle size of about 100-700 μm, about 100-600 μm, about 100-500 μm, about 100-400 μm, about 100-300 μm, or about 100-200 μm for better detoxification effects.

An undetoxified bran composition can go through a process of detoxification described hereafter, so as to obtain a reduced level of inorganic arsenic in relative to the undetoxified bran composition. An untreated bran composition can go through a process of treatment described hereafter, so as to obtain a reduced level of inorganic arsenic in relative to the untreated bran composition. An unmodified bran composition can go through a process of modification described hereafter, so as to obtain a reduced level of inorganic arsenic in relative to the unmodified bran composition.

In some embodiments, the bran composition has a level of inorganic arsenic reduced by at least about 50%, at least about 55%, at least about 60%, at least about 65%, at least about 70%, at least about 75%, at least about 80%, at least about 85%, at least about 90%, at least about 95%, at least about 98%, at least about 99%, or at least about 99.5% relative to an undetoxified bran composition. In some embodiments, the bran composition has a level of inorganic arsenic reduced by up to about 90%, up to about 91%, up to about 92%, up to about 93%, up to about 94%, up to about 95%, up to about 96%, up to about 97%, up to about 98%, up to about 99%, or up to about 99.5% relative to an undetoxified bran composition. In preferred embodiments, the bran composition of the present invention is a detoxified bran composition according to the method of detoxification described herein.

In some embodiments, the detoxified/treated/modified bran composition has up to about 0.40 mg/kg, up to about 0.35 mg/kg, up to about 0.30 mg/kg, up to about 0.25 mg/kg, up to about 0.20 mg/kg, up to about 0.15 mg/kg, up to about 0.10 mg/kg, or up to about 0.05 mg/kg of inorganic arsenic by weight.

In some embodiments, the detoxified/treated/modified bran composition has less than about 0.40 mg/kg, less than about 0.35 mg/kg, less than about 0.30 mg/kg, less than about 0.25 mg/kg, less than about 0.20 mg/kg, less than about 0.15 mg/kg, less than about 0.10 mg/kg, or less than about 0.05 mg/kg of inorganic arsenic by weight.

In specific embodiments, the bran component with a reduced level of inorganic arsenic has up to about 0.20 mg/kg, up to about 0.18 mg/kg, up to about 0.15 mg/kg, up to about 0.12 mg/kg, up to about 0.10 mg/kg, up to about 0.05 mg/kg, up to about 0.01 mg/kg, up to about 0.005 mg/kg, or up to about 0.001 mg/kg of inorganic arsenic by weight.

In specific embodiments, the bran component with a reduced level of inorganic arsenic has less than about 0.20 mg/kg, less than about 0.18 mg/kg, less than about 0.15 mg/kg, less than about 0.12 mg/kg, less than about 0.10 mg/kg, less than about 0.05 mg/kg, less than about 0.01 mg/kg, less than about 0.005 mg/kg, or less than about 0.001 mg/kg of inorganic arsenic by weight.

Advantageously, the bran composition comprising a bran component with a reduced level of inorganic arsenic is safe and addresses the concerns of the FDA.

In one embodiment, the bran composition of the subject invention is formulated into a dry product. In certain embodiments, the dry product contains about 25% or less, about 20% or less, about 15% or less, about 10% or less, about 5% or less, about 2% or less, or about 1% or less water or other solvent, or is substantially free of water or other solvent, or is anhydrous.

Grain Products

The subject invention provides a safe and improved grain product that comprises minimal levels of toxic inorganic arsenic. In one embodiment, the present invention provides a grain product that comprises a bran composition described herein, that is, the bran composition comprising a bran component with a reduced level of inorganic arsenic. Depending on intended uses, various components and/or ingredients can be included in the grain products.

In certain embodiments, the grain product is a detoxified grain product comprising a reduced level of inorganic arsenic, wherein the reduced level of inorganic arsenic is achieved relative to an undetoxified grain product, e.g., a grain product prior to any detoxification. In certain embodiments, the grain product is a treated grain product comprising a reduced level of inorganic arsenic, wherein the reduced level of inorganic arsenic is achieved relative to an untreated grain product, e.g., a grain product prior to any treatment. In certain embodiments, the grain product is a modified grain product comprising a reduced level of inorganic arsenic, wherein the reduced level of inorganic arsenic is achieved relative to an unmodified grain product, e.g., a grain product prior to any modification.

In some embodiments, the present invention provides a bran-enriched product that comprises, by the total weight of the bran-enriched product, at least about 60%, at least about 65%, at least about 70%, at least about 75%, at least about 80%, at least about 85%, at least about 90%, at least about 95%, or at least about 98% of the bran composition described herein.

In one embodiment, the bran composition in the bran-enriched product is a detoxified bran composition prepared according to the method of detoxification described herein. In another embodiment, the bran-enriched product is a detoxified bran-enriched product prepared according to the method of detoxification described herein. In such embodiments, the bran-enriched product has a level of inorganic arsenic reduced by at least about 50%, at least about 55%, at least about 60%, at least about 65%, at least about 70%, at least about 75%, at least about 80%, at least about 85%, at least about 90%, at least about 95%, at least about 98%, at least about 99%, or at least about 99.5% relative to an undetoxified bran-enriched product. In some embodiments, the bran-enriched product has a level of inorganic arsenic reduced by up to about 90%, up to about 91%, up to about 92%, up to about 93%, up to about 94%, up to about 95%, up to about 96%, up to about 97%, up to about 98%, up to about 99%, or up to about 99.5% relative to an undetoxified bran-enriched product.

In one embodiment, the present invention provides a whole grain product that comprises, in addition to the bran composition described herein, an endosperm component and/or a germ component. In one embodiment, the bran composition in the whole grain product is a detoxified bran composition. In another embodiment, the whole grain product is a detoxified whole grain product.

In some embodiments, the grain product may have up to about 0.40 mg/kg, up to about 0.35 mg/kg, up to about 0.30 mg/kg, up to about 0.25 mg/kg, up to about 0.20 mg/kg, up to about 0.15 mg/kg, up to about 0.10 mg/kg, or up to about 0.05 mg/kg of inorganic arsenic by weight.

In some embodiments, the grain product may have less than about 0.40 mg/kg, less than about 0.35 mg/kg, less than about 0.30 mg/kg, less than about 0.25 mg/kg, less than about 0.20 mg/kg, less than about 0.15 mg/kg, less than about 0.10 mg/kg, or less than about 0.05 mg/kg of inorganic arsenic by weight.

In specific embodiments, the bran composition of the grain product comprises a reduced level of inorganic arsenic, which is up to about 0.20 mg/kg, up to about 0.18 mg/kg, up to about 0.15 mg/kg, up to about 0.12 mg/kg, up to about 0.10 mg/kg, up to about 0.05 mg/kg, up to about 0.01 mg/kg, up to about 0.005 mg/kg, or up to about 0.001 mg/kg of inorganic arsenic by weight.

In specific embodiments, the bran composition of the grain product comprises a reduced level of inorganic arsenic, which is less than about 0.20 mg/kg, less than about 0.18 mg/kg, less than about 0.15 mg/kg, less than about 0.12 mg/kg, less than about 0.10 mg/kg, less than about 0.05 mg/kg, less than about 0.01 mg/kg, less than about 0.005 mg/kg, or less than about 0.001 mg/kg of inorganic arsenic by weight.

In certain embodiments, the grain product further comprises ingredients, including but being not limited to: (1) flavorings, such as sugar, honey, maple syrup, vanilla extract, cinnamon, nutmeg, and salt; (2) oils, such as canola oil, and olive oil; (3) emulsifiers, such as mono- and diglycerides; (4) preservatives, such as potassium sorbate and sodium benzoate; (5) colorants, such as artificial and natural colorants; (6) texturizers, such as xanthan gum and guar gum; and (7) functional additives, such as probiotic, prebiotic, omega-3 fatty acid, antioxidant, and minerals.

In certain embodiments, the grain product described herein can be ground into various particle sizes. In preferred embodiments, the grain product described herein has an average particle size of about 100-700 μm, about 100-600 μm, about 100-500 μm, about 100-400 μm, about 100-300 μm, or about 100-200 μm.

In some embodiments, the grain product described herein is a dry product that contains up to about 25%, up to about 20%, up to about 15%, up to about 10%, up to about 5%, up to about 2%, or up to about 1% water or other solvent, or is substantially free of water or other solvent, or is anhydrous.

In some embodiments, the grain product described herein is a dry product that contains about 25% or less, about 20% or less, about 15% or less, about 10% or less, about 5% or less, about 2% or less, or about 1% or less water or other solvent.

The grain product described herein can be directly used for consumption or can be processed into other food products.

Food Products

The present invention further provides food products that are made from the bran composition and/or the grain product described herein. In some embodiments, the bran composition and/or the grain product of the subject invention may be used as a food product or as an ingredient of a food product. In certain embodiments, the food product may be in a form that is ready for consumption or may be a food material that can be used in the preparation of a food product.

In some embodiments, the food product can be a bakery product, including but being not limited to, cookies, crackers, biscuits, pizza crusts, pie crusts, breads, bagels, pretzels, brownies, muffins, waffles, pastries, cakes, quickbreads, sweet rolls, sweet dough products, laminated doughs, liquid batters, donuts, fruit and grain bars, tortillas, and parbaked bakery products.

In certain embodiments, the food product can be an un-baked product, including but being not limited to, noodles, pasta, grain-based ice cream, and grain-based protein powder.

In certain embodiments, the food product may be confectionery, including chocolate, candies, caramels, gums (including sugar free and sugar sweetened gums, bubble gum, soft bubble gum, chewing gum) and puddings; frozen products including sorbets, preferably frozen dairy products, including ice cream and ice milk; dairy products, including cheese, butter, milk, coffee cream, whipped cream, custard cream, milk drinks and yoghurts; and dressings, mayonnaise, dips, cream based sauces, cream based soups, beverages, spice emulsions and sauces.

In other embodiments, the food product can be a baby food.

In other embodiments, the food product can be a dietary supplement.

In other embodiments, the food product can be an animal food such as a pet food, e.g., a dog or cat food.

It is not intended to limit the amount of the bran composition and/or the grain product in the food product described herein. In some embodiments where the bran composition and/or the grain product is a major component in the food product, the food product comprises, by the total weight of the food product, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or at least about 98% of the bran composition and/or the grain product described herein.

Because the bran composition and the grain product described herein is a detoxified bran composition and detoxified grain product, respectively, the food product made from such bran composition and/or such grain product is a detoxified food product, which has a level of inorganic arsenic reduced by at least about 50%, at least about 55%, at least about 60%, at least about 65%, at least about 70%, at least about 75%, at least about 80%, at least about 85%, at least about 90%, at least about 95%, at least about 98%, at least about 99%, or at least about 99.5% relative to an undetoxified food product. In some embodiments, the food product has a level of inorganic arsenic reduced by up to about 90%, up to about 91%, up to about 92%, up to about 93%, up to about 94%, up to about 95%, up to about 96%, up to about 97%, up to about 98%, up to about 99%, or up to about 99.5% relative to an undetoxified food product.

In certain embodiments, the food product according to the present invention may suitably comprise one or more of the following additives:

- phytochemical (e.g., anthocyanonide, carotenoid, bioflavinoid, glutathione, catechin, isoflavone, lycopene, ginsenoside, pycnogenol, alkaloid, pygeum phytosterol, suiphoraphone, resveretol, grape seed extract or food containing stanol esters),
- vitamin (e.g., vitamin C, vitamin A, vitamin B3, vitamin D, vitamin E, thiamine, riboflavin, niacin, pyridoxine, cyanocobalamin, folic acid, biotin, pantothenic acid or vitamin K),
- minerals (e.g., calcium, iodine, magnesium, zinc, iron, selenium, manganese, chromium, copper, cobalt, molybdenum, or phosphorus),
- fatty acid (e.g., gamma-linoleic acid, ucospentaenoic acid or decosahexaenoic acid),
- oil (e.g., borage oil, high carotenoid canola oil or flax seed oil),
- amino acid (e.g., tryptophan, lysine, methionine, phenylalanine, threonine, valine, leucine, isoleucine, alanine, arginine, aspartic acid, cystine, cysteine, glutamic acid, glutamine, glycine, histidine, proline, hydroxyproline, serine, taurine or tyrosine), and
- friendly bacteria (e.g., *Lactobacillus acidophilus, Lactobacillus bulgaricus, Lactobacillus bifidus, Lactobacillus plantarum* or *Streptococcus faecium*).

In certain embodiments, the food product may also comprise glycerol, sorbitol, enzyme lignin, stanol ester or folic acid, and/or insoluble and/or soluble fibre.

Methods of Detoxification

The subject invention provides methods for producing a safe and improved bran and/or grain product that comprises minimal levels of toxic inorganic arsenic. Specifically, according to the present invention, the amount of inorganic arsenic in bran, such as rice bran, can be greatly reduced by enzymatic methylation of the inorganic arsenic into much less toxic DMAs. Thus, such process can be used to produce safer bran products and reduce the adverse developmental effects of consumption of arsenic-containing food (e.g., baby food), as well as reduce the carcinogenic effects of bran-containing dietary supplements and produce healthier animal feed.

Figure 5:
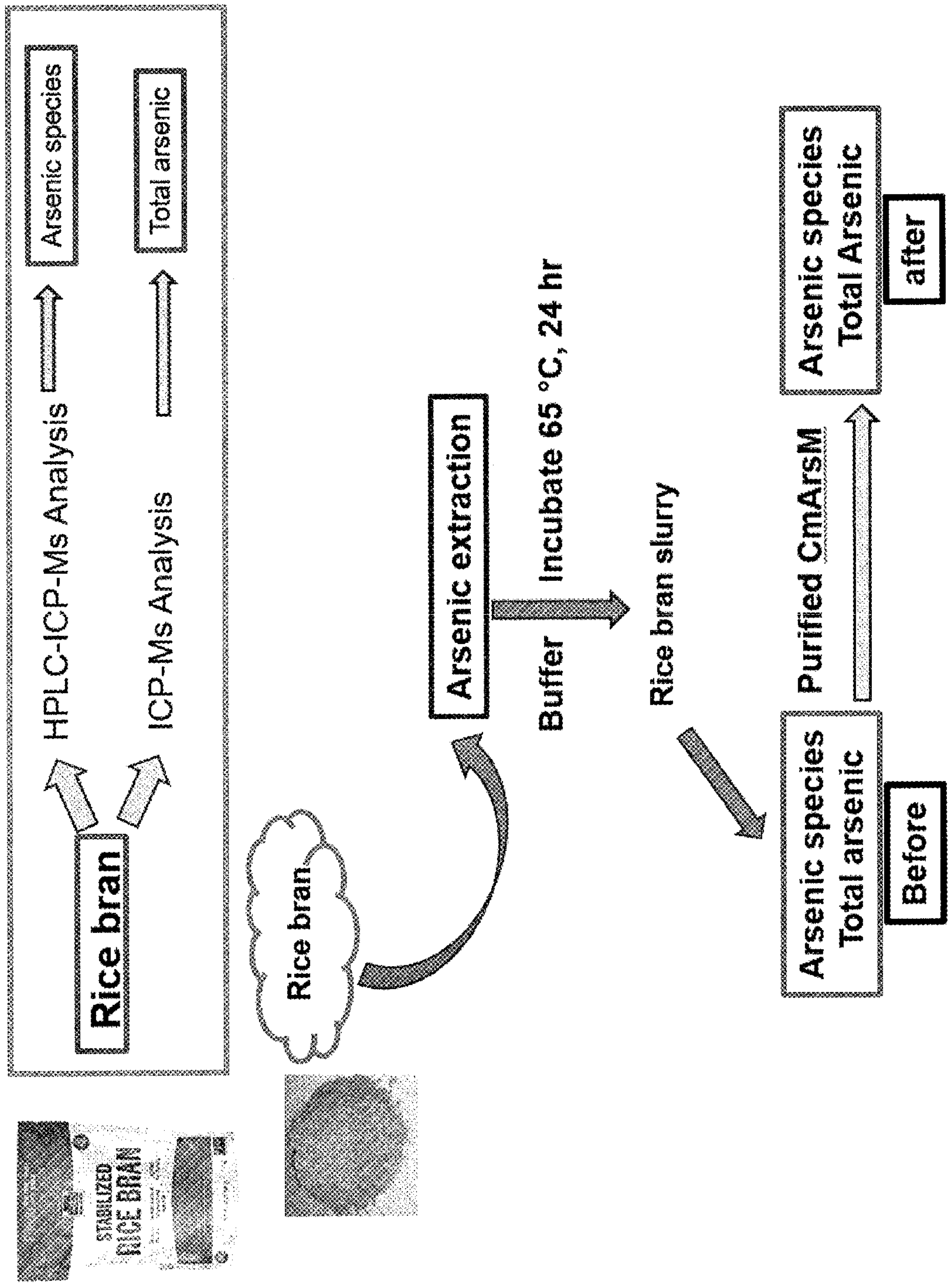
FIG. 5 shows methylation of inorganic arsenic in commercial rice bran by purified CmArsM at 65° C.

In specific embodiments, the present invention provides an enzymatic process to reduce inorganic arsenic in a sample of, for example, a rice bran (FIG. 5). For example, the enzymatic process involves inorganic arsenic extraction followed by enzymatic methylation of inorganic arsenic from toxic As(III) and/or As(V) to, for example, non-toxic methyarsenate (MAs(V)) and dimethylarsenate (DMAs(V)).

In one embodiment, the subject invention provides a method of reducing inorganic arsenic in a sample, the method comprising providing the sample containing a certain level of inorganic arsenic, and methylating the inorganic arsenic with an enzyme, preferably, a heat-stable methylating enzyme, such as arsenic S-adenosylmethionine methyltransferase.

In specific embodiments, the arsenic S-adenosylmethionine methyltransferase is an As(III) S-adenosylmethionine methyltransferase. In a preferred embodiment, the arsenic S-adenosylmethionine methyltransferase is the heat-stable CmArsM.

In some embodiments, the sample is a bran product containing inorganic arsenic at a level exceeding FDA requirement. In some embodiments, the sample is a bran composition comprising a bran component. In other embodiments, the sample is a grain product comprising a bran composition.

In other embodiments, the sample is a mixture of a bran composition or a grain product with a buffer solution, preferably a slurry obtained by mixing a bran composition or a grain product with a buffer solution or suspending/soaking a bran composition or a grain product in a buffer solution, wherein the mixture or the slurry comprises at least about 80%, at least about 85%, at least about 90%, at least about 91%, at least about 92%, at least about 93%, at least about 94%, at least about 95%, at least about 96%, at least about 97%, at least about 98%, at least about 99%, or 100% of the arsenic contained in the bran composition and/or the grain product.

In one embodiment, the present invention provides a method of detoxifying a bran composition, comprising the following steps:

(1) Creating a slurry by suspending the bran composition in a buffer solution (e.g., MOPS buffer); and (2) Methylating inorganic arsenic in the slurry by treating the slurry with at least one heat-stable enzyme such as heat-stable methylating enzyme.

In some embodiments, the bran composition used in this method comprises a bran component with a certain level of inorganic arsenic. In some embodiments, the bran composition, prior to detoxification, contains at least about 1 mg/kg, at least about 2 mg/kg, at least about 3 mg/kg, at least about 4 mg/kg, at least about 5 mg/kg, at least about 6 mg/kg, at least about 7 mg/kg, at least about 8 mg/kg, at least about 9 mg/kg, or at least about 10 mg/kg of inorganic arsenic by weight.

In specific embodiments, the bran composition used in this method contains about 0.5-10 mg/kg, about 0.5-9 mg/kg, about 1-8 mg/kg, about 2-7 mg/kg, about 3-6 mg/kg, about 4-5 mg/kg, about 0.5-8 mg/kg, about 1-7 mg/kg, about 1-6 mg/kg, about 1-5 mg/kg, about 1-4 mg/kg, about 1-3 mg/kg, about 2-4 mg/kg, or about 3-4 mg/kg of inorganic arsenic by weight. In a specific embodiment, the bran composition used in this method has about 3-4 mg/kg of inorganic arsenic by weight. In a specific embodiment, the bran composition used in this method has about 7-8 mg/kg of inorganic arsenic by weight.

In certain embodiments, the bran component comes from various cereal grains, including, but being not limited to, rice, corn, wheat, oat, barley, rye, and millet. Depending on the different sources, the bran component, used herein, can be a rice bran composition comprising a rice bran component with a certain level of inorganic arsenic, a corn bran composition comprising a corn bran component with a certain level of inorganic arsenic, a wheat bran composition comprising a wheat bran component with a certain level of inorganic arsenic, an oat bran composition comprising an oat bran component with a certain level of inorganic arsenic, a barley bran composition comprising a barley bran component with a certain level of inorganic arsenic, a rye bran composition comprising a rye bran component with a certain level of inorganic arsenic, or a millet bran composition comprising a millet bran component with a certain level of inorganic arsenic.

In some embodiments, the bran composition comprises two or more different sourced bran components selected from, for example, a rice bran component, corn bran component, wheat bran component, oat bran component, barley bran component, rye bran component, and millet bran component.

In certain embodiments, the bran component is obtained by milling the cereal grains, and thus is inevitably mixed with components from other parts of the whole grain, such as endosperm and germ. Nevertheless, the bran component should constitute a major portion of the bran composition described herein. In some embodiments, the amount of the bran component is at least about 60%, at least about 65%, at least about 70%, at least about 75%, at least about 80%, at least about 85%, at least about 90%, at least about 95%, or at least about 98% of the bran composition by weight. In other embodiments, the amount of the bran component is up to about 60%, up to about 65%, up to about 70%, up to about 75%, up to about 80%, up to about 85%, up to about 90%, up to about 95%, or up to about 98% of the bran composition by weight. In preferred embodiments, the bran composition comprises no other components except for those inevitably introduced into the bran component during production of the bran component.

In certain embodiments, the bran component can be in the form of coarse bran, or fine bran that is ground into various particle sizes. In preferred embodiments, the bran component used herein has an average particle size of about 100-700 μm, about 100-600 μm, about 100-500 μm, about 100-400 μm, about 100-300 μm, or about 100-200 μm for better detoxification effects.

In some embodiments, the buffer solution used in step (1) is a MOPS buffer solution comprising about 10-100 mM, about 10-90 mM, about 10-80 mM, about 10-70 mM, about 10-60 mM, about 10-50 mM, about 20-100 mM, about 30-100 mM, about 40-100 mM, about 50-100 mM, about 20-90 mM, about 30-80 mM, about 40-70 mM, or about 40-60 mM Mops.

In some embodiments, the MOPS buffer solution further comprises about 50-150 mM, about 50-140 mM, about 50-130 mM, about 50-120 mM, about 50-110 mM, about 50-100 mM, about 60-150 mM, about 70-150 mM, about 80-150 mM, about 90-150 mM, about 100-150 mM, about 60-140 mM, about 70-130 mM, about 80-120 mM, or about 90-110 mM NaCl. In some embodiments, the MOPS buffer solution has a pH of about 7.0-8.0, about 7.0-7.9, about 7.0-7.8, about 7.0-7.7, about 7.0-7.6, about 7.0-7.5, about 7.1-8.0, about 7.2-8.0, about 7.3-8.0, about 7.4-8.0, about 7.5-8.0, about 7.1-7.9, about 7.2-7.8, about 7.3-7.7, or about 7.4-7.6. In some embodiments, step (1) further comprises degassing the MOPS buffer solution before suspending the bran composition in it.

In certain embodiments, in step (1), the slurry is created by incubating the bran composition with the buffer, e.g., MOPS buffer, for a duration in the range of about 1-40 hrs, about 2-35 hrs, about 5-30 hrs, about 10-30 hrs, about 12-25 hrs, about 15-25 hrs, or about 20-25 hrs. In preferred embodiments, the duration of such incubation can be in the range of about 15-35 hrs or about 20-30 hrs. In a specific embodiment, the duration of such incubation is about 24 hrs.

In certain embodiments, for 1 g bran composition, about 10-20 mL, preferably about 12-18 mL, more preferably about 14-16 mL buffer solution, such as MOPS buffer solution, is used for relatively complete extraction (e.g., >90%, 91%, 92%, 93%, 94%, 95%, 96%, 97%, 98%, 99%, 99.5% or 99.9%).

In certain embodiments, step (2) comprises incubating the mixture of the bran slurry and the heat-stable enzyme, e.g., CmArsM, for a period of time, at a temperature of about 40° C.-90° C., preferably about 50° C.-80° C., and more preferably about 60° C.-70° C. In a specific embodiment, the mixture of the bran slurry and the heat-stable enzyme, e.g., CmArsM, is incubated at a temperature of about 65° C.

In certain embodiments, the duration of incubating the mixture of the bran slurry and the heat-stable enzyme, e.g., CmArsM, may be in a range of about 10 mins or less to 48 hrs or more, about 20 mins or less to 36 hrs or more, about 30 mins or less to 30 hrs or more, about 40 mins or less to 24 hrs or more, about 50 mins or less to 20 hrs or more, about 60 mins or less to 12 hrs or more, about 70 mins or less to 10 hrs or more, about 80 mins or less to 9 hrs or more, about 90 mins or less to 5 hrs or more, or about 100 mins or less to 4 hrs or more.

In some embodiments, step (2) comprises mixing the slurry obtained in step (1) with at least one methylating enzyme. In some embodiments, the methylating enzyme is a heat-stable methylating enzyme, preferably an arsenic S-adenosylmethionine methyltransferase. In specific embodiments, the arsenic S-adenosylmethionine methyltransferase is a thermophilic As(III) S-adenosylmethionine methyltransferase. In a preferred embodiment, the arsenic S-adenosylmethionine methyltransferase is CmArsM.

In some embodiments, step (2) optionally further comprises mixing the slurry with S-adenosylmethionine (SAM) and a reducing chemical, e.g., tris(2-carboxyethyl) phosphine (TCEP).

In certain embodiments, the slurry (such as rice bran slurry), the at least one methylating enzyme (such as the heat-stable CmArsM), and the optional SAM and TCEP are further incubated at a temperature of about 40° C.-90° C., preferably about 50° C.-80° C., and more preferably about 60° C.-70° C. In a specific embodiment, the slurry (such as rice bran slurry), the at least one methylating enzyme (such as heat-stable CmArsM), and the optional SAM and TCEP are further incubated at a temperature of about 65° C.

In certain embodiments, the duration of incubation for methylating inorganic arsenic in the slurry (such as rice bran slurry) can be in a range of about 0.5 hr to 48 hrs, about 1 hr to 36 hrs, about 2 hrs to 30 hrs, about 3 hrs to 24 hrs, about 4 hrs to 20 hrs, about 5 hrs to 18 hrs, about 6 hrs to 14 hrs, about 7 hrs to 13 hrs, or about 8 hrs to 12 hrs. In some embodiments, step (2) comprises incubating the slurry (such as rice bran slurry), the at least one methylating enzyme (such as heat stable CmArsM), and the optional SAM and TCEP with shaking at about 100-500 rpm, about 150-450 rpm, 200-400 rpm, 250-350 rpm, 250-300 rpm, or 300-350 rpm.

In some embodiments, step (2) comprises methylating at least about 70%, at least about 75%, at least about 80%, at least about 85%, at least about 90%, at least about 95%, at least about 98%, at least about 99%, at least about 99.5%, or at least about 99.9% of the inorganic arsenic contained in the slurry obtained from step (1). In some embodiments, step (2) comprises methylating up to about 90%, up to about 91%, up to about 92%, up to about 93%, up to about 94%, up to about 95%, up to about 96%, up to about 97%, up to about 98%, up to about 99%, up to about 99.5%, or up to about 99.9% of the inorganic arsenic contained in the slurry obtained from step (1).

By the method of detoxifying a bran composition described herein, a detoxified bran composition is obtained with a reduced level of inorganic arsenic in relative to an undetoxified bran composition. In some embodiments, the detoxified bran composition has a level of inorganic arsenic reduced by at least about 50%, at least about 55%, at least about 60%, at least about 65%, at least about 70%, at least about 75%, at least about 80%, at least about 85%, at least about 90%, at least about 95%, at least about 98%, at least about 99%, at least about 99.5%, or at least about 99.9% relative to an undetoxified bran composition. In some embodiments, the detoxified bran composition has a level of inorganic arsenic reduced by up to about 90%, up to about 91%, up to about 92%, up to about 93%, up to about 94%, up to about 95%, up to about 96%, up to about 97%, up to about 98%, up to about 99%, up to about 99.5%, or up to about 99.9% relative to an undetoxified bran composition.

In specific embodiments, the detoxified bran composition comprises a reduced level of inorganic arsenic, which is up to about 0.20 mg/kg, up to about 0.18 mg/kg, up to about 0.15 mg/kg, up to about 0.12 mg/kg, up to about 0.10 mg/kg, up to about 0.05 mg/kg, up to about 0.01 mg/kg, up to about 0.005 mg/kg, or up to about 0.001 mg/kg of inorganic arsenic by weight.

In specific embodiments, the detoxified bran composition comprises a reduced level of inorganic arsenic, which is about 0.20 mg/kg or less, about 0.18 mg/kg or less, about 0.15 mg/kg or less, about 0.12 mg/kg or less, about 0.10 mg/kg or less, about 0.05 mg/kg or less, about 0.01 mg/kg or less, about 0.005 mg/kg or less, or about 0.001 mg/kg or less of inorganic arsenic by weight.

In certain embodiments, the method can further comprise the following step after methylation of the inorganic arsenic: drying the slurry obtained from step (2) to obtain a dry product, and optionally milling the dried product. In certain embodiments, the method can further comprise the following steps after methylation of the inorganic arsenic: treating the slurry obtained from step (2) with at least one other heat-stable enzyme to extract nutrient(s) such as proteins, fat and/or carbohydrates, centrifugating the slurry to separate the pellet, drying the pellet, and optionally milling the dried pellet.

In certain embodiments, the method can further comprise separating supernatant from the slurry obtained from step (2) by centrifugation or settling of the insoluble component. In certain embodiments, the method further comprises digesting the supernatant with a nitric acid solution, and conducting arsenic species analysis on the digest, for example, by HPLC-ICP-MS. The nitric acid solution used herein may have a concentration of about 1% to 90%, about 1% to 80%, about 1% to 70%, about 1% to 60%, about 1% to 50%, about 1% to 40%, about 1% to 30%, about 1% to 20%, about 1% to 10%, about 1% to 5%, about 1% to 2%, about 5% to 80%, about 10% to 70%, about 20% to 60%, about 30% to 50%, about 10% to 40%, about 20% to 50%, about 30% to 60%, about 40% to 70%, about 50% to 80%, about 60% to 90%, about 10% to 20%, about 20% to 30%, about 30% to 40%, about 40% to 50%, about 50% to 60%, about 60% to 70%, about 70% to 80%, or about 80% to 90%. In a specific embodiment, the nitric acid solution is 70% $HNO_3$. In a specific embodiment, the nitric acid solution is 2% $HNO_3$.

In certain embodiments, the method can further comprise determining the methylation efficiency of the methylating enzyme by arsenic species analysis. In some embodiments, at least about 50%, at least about 55%, at least about 60%, at least about 65%, at least about 70%, at least about 75%, at least about 80%, at least about 85%, at least about 90%, at least about 95%, at least about 98%, at least about 99%, at least about 99.5%, or at least about 99.9% of the inorganic arsenic contained in the bran composition is methylated according to the method described herein. In some embodiments, up to about 90%, up to about 91%, up to about 92%, up to about 93%, up to about 94%, up to about 95%, up to about 96%, up to about 97%, up to about 98%, up to about 99%, up to about 99.5%, or up to about 99.9% of the inorganic arsenic contained in the bran composition is methylated according to the method described herein.

In one embodiment, the subject invention provides a method of detoxifying a bran product, the method comprising mixing the bran product with a buffer solution (such as MOPS buffer) to create a slurry; and incubating the slurry with a methylating enzyme, e.g., an arsenic S-adenosylmethionine methyltransferase, to methylate the inorganic arsenic in the slurry.

In one embodiment, the subject invention provides a method of detoxifying a bran composition, the method comprising mixing the bran composition with a buffer solution (such as MOPS buffer) to create a slurry; and incubating the slurry with a methylating enzyme, e.g., an arsenic S-adenosylmethionine methyltransferase, to methylate the inorganic arsenic in the slurry.

In some embodiments, the method further comprises a step of extracting inorganic arsenic from the bran composition or the slurry using an extracting agent, for example, a nitric acid solution to obtain an arsenic extract, prior to and/or after the enzymatic treatment of the bran composition or the slurry. In certain embodiments, the extracting agent is a nitric acid solution having a concentration of about 1% to 90%, about 1% to 80%, about 1% to 70%, about 1% to 60%, about 1% to 50%, about 1% to 40%, about 1% to 30%, about 1% to 20%, about 1% to 10%, about 1% to 5%, about 1% to 2%, about 5% to 80%, about 10% to 70%, about 20% to 60%, about 30% to 50%, about 10% to 40%, about 20% to 50%, about 30% to 60%, about 40% to 70%, about 50% to 80%, about 60% to 90%, about 10% to 20%, about 20% to 30%, about 30% to 40%, about 40% to 50%, about 50% to 60%, about 60% to 70%, about 70% to 80%, or about 80% to 90%. In a specific embodiment, the extracting agent is 70% $HNO_3$. In a specific embodiment, the extracting agent is 2% $HNO_3$.

In certain embodiments, the method further comprises a step of detecting arsenic species in the obtained arsenic extract by, for example, HPLC-ICP-MS and/or ICP-Ms analysis.

In certain embodiments, the step of extracting inorganic arsenic comprises incubating the bran composition or the slurry with the extracting agent before and/or after the enzymatic treatment of the bran composition or the slurry. In specific embodiments, duration of such incubation may vary with the different extracting agent. In embodiments where the extracting agent is 70% $HNO_3$, the duration of incubation can be in the range of about 10-70 mins, preferably in the range of about 20-60 mins, and more preferably in the range of about 30-50 mins. In a specific embodiment, the duration of incubation is about 40 mins. In embodiments where the extracting agent is 2% $HNO_3$ buffer, the duration of incubation can be in the range of about 1-40 hrs, about 2-35 hrs, about 5-30 hrs, about 10-30 hrs, about 12-25 hrs, about 15-25 hrs, or about 20-25 hrs. In preferred embodiments, the duration of incubation can be in the range of about 15-35 hrs or about 20-30 hrs. In a specific embodiment, the duration of incubation is about 24 hrs.

In certain embodiments, the method of the subject invention further comprises one or more of the following steps: obtaining an extract solution after extracting inorganic arsenic; separating the insoluble component from the extract solution; washing the obtained insoluble component; and/or drying the washed insoluble component.

In some embodiments, the method can detoxify the bran composition by reducing the inorganic arsenic contained in the bran composition by at least about 80%, at least about 85%, at least about 90%, at least about 91%, at least about 92%, at least about 93%, at least about 94%, at least about 95%, at least about 96%, at least about 97%, at least about 98%, at least about 99%, or 100%.

In certain embodiments, the method may further, optionally, comprise, after the enzymatic treatment, obtaining a pellet, via, for example, centrifugation, or settling of the insoluble bran, filtering the treated slurry, and/or recovering the pellet or the insoluble bran.

In certain embodiments, the method of the subject invention provides a relatively complete methylation (e.g., >90%, 91%, 92%, 93%, 94%, 95%, 96%, 97%, 98%, 99%, 99.5% or 99.9%).

In one embodiment, the present invention provides a method of detoxifying a grain product, comprising the following step:

(1) Creating a slurry by suspending the grain product in a buffer solution; and (2) Methylating inorganic arsenic in the slurry by treating the slurry with at least one methylating enzyme.

In some embodiments, the grain product used in this method comprises a bran composition that comprises a bran component with a certain level of inorganic arsenic. In some embodiments, the bran composition, prior to detoxification, contains at least about 1 mg/kg, at least about 2 mg/kg, at least about 3 mg/kg, at least about 4 mg/kg, at least about 5 mg/kg, at least about 6 mg/kg, at least about 7 mg/kg, at least about 8 mg/kg, at least about 9 mg/kg, or at least about 10 mg/kg of inorganic arsenic by weight.

In specific embodiments, the bran composition used in this method contains about 0.5-10 mg/kg, about 0.5-9 mg/kg, about 1-8 mg/kg, about 2-7 mg/kg, about 3-6 mg/kg, about 4-5 mg/kg, about 0.5-8 mg/kg, about 1-7 mg/kg, about 1-6 mg/kg, about 1-5 mg/kg, about 1-4 mg/kg, about 1-3 mg/kg, about 2-4 mg/kg, or about 3-4 mg/kg of inorganic arsenic by weight. In a specific embodiment, the bran composition used in this method has about 3-4 mg/kg of inorganic arsenic by weight. In another embodiment, the bran composition used in this method has about 7-8 mg/kg of inorganic arsenic by weight.

In certain embodiments, the bran component can come from various cereal grains, including, but being not limited to, rice, corn, wheat, oat, barley, rye, and millet. Depending on different sources of the bran component, used herein can be a rice bran composition comprising a rice bran component with a certain level of inorganic arsenic, a corn bran composition comprising a corn bran component with a certain level of inorganic arsenic, a wheat bran composition comprising a wheat bran component with a certain level of inorganic arsenic, an oat bran composition comprising an oat bran component with a certain level of inorganic arsenic, a barley bran composition comprising a barley bran component with a certain level of inorganic arsenic, a rye bran composition comprising a rye bran component with a certain level of inorganic arsenic, or a millet bran composition comprising a millet bran component with a certain level of inorganic arsenic.

In some embodiments, the bran composition can comprise two or more different sourced bran components selected from rice bran component, corn bran component, wheat bran component, oat bran component, barley bran component, rye bran component, and millet bran component.

In certain embodiments, the bran component can be obtained by milling the cereal grains, and thus is inevitably mixed with components from other parts of the whole grain, such as endosperm and germ. Nevertheless, the bran component should constitute a major portion of the bran composition described herein. In some embodiments, the amount of the bran component is at least about 60%, at least about 65%, at least about 70%, at least about 75%, at least about 80%, at least about 85%, at least about 90%, at least about 95%, or at least about 98% of the bran composition by weight. In other embodiments, the amount of the bran component is up to about 60%, up to about 65%, up to about 70%, up to about 75%, up to about 80%, up to about 85%, up to about 90%, up to about 95%, or up to about 98% of the bran composition by weight. In preferred embodiments, the bran composition comprises no other components.

Depending on intended uses, various components and/or ingredients can be included in the grain products.

In some embodiments, the grain product used in this method is a bran-enriched product that comprises, by the total weight of the bran-enriched product, at least about 60%, at least about 65%, at least about 70%, at least about 75%, at least about 80%, at least about 85%, at least about 90%, at least about 95%, or at least about 98% of the bran composition described herein.

In other embodiments, the grain product used in this method is a whole grain product that comprises, in addition to the bran composition described herein, an endosperm component and a germ component.

In certain embodiments, the grain product can further comprise ingredients, including, but being not limited to: (1) flavorings, such as sugar, honey, maple syrup, vanilla extract, cinnamon, nutmeg, and salt; (2) oils, such as canola oil, and olive oil; (3) emulsifiers, such as mono- and diglycerides; (4) preservatives, such as potassium sorbate and sodium benzoate; (5) colorants, such as artificial and natural colorants; (6) texturizers, such as xanthan gum and guar gum; and (7) functional additives, such as probiotic, prebiotic, omega-3 fatty acid, antioxidant, and minerals.

In certain embodiments, the grain product used in this method can be ground into various particle sizes. In preferred embodiments, the grain product used in this method has an average particle size of about 100-700 μm, about 100-600 μm, about 100-500 μm, about 100-400 μm, about 100-300 μm, or about 100-200 μm for better detoxification effects.

In some embodiments, the grain product used in this method is a dry product that contains up to about 25%, up to about 20%, up to about 15%, up to about 10%, or up to about 5% water or other solvent, or is substantially free of water or other solvent, or is anhydrous.

In some embodiments, the buffer solution used in step (1) is a MOPS buffer solution comprising about 10-100 mM, about 10-90 mM, about 10-80 mM, about 10-70 mM, about 10-60 mM, about 10-50 mM, about 20-100 mM, about 30-100 mM, about 40-100 mM, about 50-100 mM, about 20-90 mM, about 30-80 mM, about 40-70 mM, or about 40-60 mM Mops.

In some embodiments, the MOPS buffer solution further comprises about 50-150 mM, about 50-140 mM, about 50-130 mM, about 50-120 mM, about 50-110 mM, about 50-100 mM, about 60-150 mM, about 70-150 mM, about 80-150 mM, about 90-150 mM, about 100-150 mM, about 60-140 mM, about 70-130 mM, about 80-120 mM, or about 90-110 mM NaCl. In some embodiments, the MOPS buffer solution has a pH of about 7.0-8.0, about 7.0-7.9, about 7.0-7.8, about 7.0-7.7, about 7.0-7.6, about 7.0-7.5, about 7.1-8.0, about 7.2-8.0, about 7.3-8.0, about 7.4-8.0, about 7.5-8.0, about 7.1-7.9, about 7.2-7.8, about 7.3-7.7, or about 7.4-7.6. In some embodiments, step (1) further comprises degassing the MOPS buffer solution before suspending the grain product in it.

In certain embodiments, step (2) comprises incubating the grain slurry with the at least one heat-stable methylating enzyme for a period of time. In certain embodiments, the mixture of the grain slurry and the at least one heat-stable methylating enzyme is incubated at a temperature of about 40° C.-90° C., preferably about 50° C.-80° C., and more preferably about 60° C.-70° C. In a specific embodiment, the mixture of the grain slurry and the at least one heat-stable methylating enzyme is incubated at a temperature of about 65° C.

In certain embodiments, the duration of incubating the mixture of the grain slurry and the heat-stable methylating enzyme may be in a range of about 10 mins to 48 hrs, about 20 mins to 36 hrs, about 30 mins to 30 hrs, about 40 mins to 24 hrs, about 50 mins to 20 hrs, about 60 mins to 12 hrs, about 70 mins to 10 hrs, about 80 mins to 9 hrs, about 90 mins to 5 hrs, or about 100 mins to 4 hrs.

In certain embodiments, the duration of incubation may vary with the different methylating enzyme. In embodiments where the methylating enzyme is CmArsM, the duration of incubation can be in the range of about 10-70 mins, preferably in the range of about 20-60 mins, and more preferably in the range of about 30-50 mins. In a specific embodiment, the duration of incubation is about 40 mins. In embodiments where the methylating enzyme is CmArsM in MOPS buffer, the duration of incubation can be in the range of about 1-40 hrs, about 2-35 hrs, about 5-30 hrs, about 10-30 hrs, about 12-25 hrs, about 15-25 hrs, or about 20-25 hrs. In preferred embodiments, the duration of incubation can be in the range of about 15-35 hrs or about 20-30 hrs. In a specific embodiment, the duration of incubation is about 24 hrs.

In some embodiments, step (2) can be conducted by mixing the slurry obtained in step (1) with at least one methylating enzyme.

In some embodiments, the methylating enzyme used in step (2) is a heat-stable methylating enzyme, preferably an arsenic S-adenosylmethionine methyltransferase. In such embodiments, the arsenic S-adenosylmethionine methyltransferase is a thermophilic As(III) S-adenosylmethionine methyltransferase. In preferred embodiments, the arsenic S-adenosylmethionine methyltransferase is CmArsM.

In some embodiments, step (2) can be conducted by optionally further mixing with S-adenosylmethionine (SAM) and a reducing chemical, tris(2-carboxyethyl)phosphine (TCEP).

In certain embodiments, the slurry, the at least one methylating enzyme (such as arsenic S-adenosylmethionine methyltransferase), and the optional SAM and TCEP are further incubated at a temperature of about 40° C.-90° C., preferably about 50° C.-80° C., and more preferably about 60° C.-70° C. In a specific embodiment, the slurry, the at least one methylating enzyme (such as arsenic S-adenosylmethionine methyltransferase), and the optional SAM and TCEP are further incubated at a temperature of about 65° C.

In certain embodiments, the duration of incubation for methylating inorganic arsenic in the slurry can be in the range of about 0.5 hr to 48 hrs, about 1 hr to 36 hrs, about 2 hrs to 30 hrs, about 3 hrs to 24 hrs, about 4 hrs to 20 hrs, about 5 hrs to 18 hrs, about 6 hrs to 14 hrs, about 7 hrs to 13 hrs, or about 8 hrs to 12 hrs. In some embodiments, step (2) comprises incubating the slurry, the at least one methylating enzyme, and the optional SAM and TCEP with shaking at about 100-500 rpm, about 150-450 rpm, 200-400 rpm, 250-350 rpm, 250-300 rpm, or 300-350 rpm.

In some embodiments, step (2) comprises methylating at least about 70%, at least about 75%, at least about 80%, at least about 85%, at least about 90%, at least about 95%, or at least about 98% of the inorganic arsenic contained in the slurry obtained from step (1). In some embodiments, step (2)

comprises methylating up to about 90%, up to about 91%, up to about 92%, up to about 93%, up to about 94%, up to about 95%, up to about 96%, up to about 97%, up to about 98%, up to about 99%, up to about 99.5%, or up to about 99.9% of the inorganic arsenic contained in the slurry obtained from step (1).

In some embodiments, the method further comprises mixing the grain product or grain slurry with an extracting agent, for example, a nitric acid solution, to obtain an arsenic extract, prior to and/or after the enzymatic treatment of the grain product or the grain slurry. In certain embodiments, the extracting agent is a nitric acid solution having a concentration of about 1% to 90%, about 1% to 80%, about 1% to 70%, about 1% to 60%, about 1% to 50%, about 1% to 40%, about 1% to 30%, about 1% to 20%, about 1% to 10%, about 1% to 5%, about 1% to 2%, about 5% to 80%, about 10% to 70%, about 20% to 60%, about 30% to 50%, about 10% to 40%, about 20% to 50%, about 30% to 60%, about 40% to 70%, about 50% to 80%, about 60% to 90%, about 10% to 20%, about 20% to 30%, about 30% to 40%, about 40% to 50%, about 50% to 60%, about 60% to 70%, about 70% to 80%, or about 80% to 90%. In a specific embodiment, the extracting agent is 70% $HNO_3$. In a specific embodiment, the extracting agent is 2% $HNO_3$.

In certain embodiments, the method further comprises a step of detecting arsenic species in the obtained arsenic extract by, for example, HPLC-ICP-MS and/or ICP-Ms analysis.

In some embodiments, the method can detoxify the grain product by reducing the inorganic arsenic contained in the grain product by at least about 80%, at least about 85%, at least about 90%, at least about 91%, at least about 92%, at least about 93%, at least about 94%, at least about 95%, at least about 96%, at least about 97%, at least about 98%, at least about 99%, or 100%.

In certain embodiments, the method may further comprise, after the enzymatic treatment, obtaining a pellet, via, for example, centrifugation, or settling of the insoluble grain, filtering the treated grain slurry, and/or recovering the pellet or the insoluble grain.

By the method of detoxifying a grain product described herein, a detoxified grain product is obtained with a reduced level of inorganic arsenic relative to an undetoxified grain product. In some embodiments, the detoxified grain product has a level of inorganic arsenic reduced by at least about 50%, at least about 55%, at least about 60%, at least about 65%, at least about 70%, at least about 75%, at least about 80%, at least about 85%, at least about 90%, at least about 95%, at least about 98%, at least about 99%, at least about 99.5%, or at least about 99.9% relative to an undetoxified grain product. In some embodiments, the detoxified grain product has a level of inorganic arsenic reduced by up to about 90%, up to about 91%, up to about 92%, up to about 93%, up to about 94%, up to about 95%, up to about 96%, up to about 97%, up to about 98%, up to about 99%, up to about 99.5%, or up to about 99.9% relative to an undetoxified grain product.

In specific embodiments, the detoxified grain composition comprises a reduced level of inorganic arsenic, which is up to about 0.20 mg/kg, up to about 0.18 mg/kg, up to about 0.15 mg/kg, up to about 0.12 mg/kg, up to about 0.10 mg/kg, up to about 0.05 mg/kg, up to about 0.01 mg/kg, up to about 0.005 mg/kg, or up to about 0.001 mg/kg of inorganic arsenic by weight.

In specific embodiments, the detoxified grain composition comprises a reduced level of inorganic arsenic, which is less than about 0.20 mg/kg, less than about 0.18 mg/kg, less than about 0.15 mg/kg, less than about 0.12 mg/kg, less than about 0.10 mg/kg, less than about 0.05 mg/kg, less than about 0.01 mg/kg, less than about 0.005 mg/kg, or less than about 0.001 mg/kg of inorganic arsenic by weight.

In some embodiments, the method can further comprise the following step after methylation of the inorganic arsenic: drying the slurry obtained from step (2) to obtain a dry product, and optionally, milling the dried product. In certain embodiments, the method can further comprise the following steps after methylation of the inorganic arsenic: treating the slurry obtained from step (2) with at least one other heat-stable enzyme to extract nutrient(s) such as proteins, fat and/or carbohydrates, centrifugating the slurry to separate the pellet, drying the pellet, and optionally milling the dried pellet.

In certain embodiments, the detoxified grain product obtained herein can be directly used for consumption or can be processed into other food products.

In certain embodiments, the method can further comprise separating supernatant from the slurry obtained from step (2) by centrifugation or settling of the insoluble component. In certain embodiments, the method can further comprise digesting the supernatant with a nitric acid solution, and conducting arsenic species analysis on the digest, for example, by HPLC-ICP-MS. The nitric acid solution used herein may have a concentration of about 1% to 90%, about 1% to 80%, about 1% to 70%, about 1% to 60%, about 1% to 50%, about 1% to 40%, about 1% to 30%, about 1% to 20%, about 1% to 10%, about 1% to 5%, about 1% to 2%, about 5% to 80%, about 10% to 70%, about 20% to 60%, about 30% to 50%, about 10% to 40%, about 20% to 50%, about 30% to 60%, about 40% to 70%, about 50% to 80%, about 60% to 90%, about 10% to 20%, about 20% to 30%, about 30% to 40%, about 40% to 50%, about 50% to 60%, about 60% to 70%, about 70% to 80%, or about 80% to 90%. In a specific embodiment, the nitric acid solution is 70% $HNO_3$. In a specific embodiment, the nitric acid solution is 2% $HNO_3$.

In certain embodiments, the method further comprises determining the methylation efficiency of the methylating enzyme by arsenic species analysis. In some embodiments, at least about 50%, at least about 55%, at least about 60%, at least about 65%, at least about 70%, at least about 75%, at least about 80%, at least about 85%, at least about 90%, at least about 95%, at least about 98%, at least about 99%, at least about 99.5%, or at least about 99.9% of the inorganic arsenic contained in the grain product is methylated according to the method described herein. In some embodiments, up to about 90%, up to about 91%, up to about 92%, up to about 93%, up to about 94%, up to about 95%, up to about 96%, up to about 97%, up to about 98%, up to about 99%, up to about 99.5%, or up to about 99.9% of the inorganic arsenic contained in the grain product is methylated according to the method described herein.

In one embodiment, the subject invention provides a method of detoxifying a grain product, the method comprising mixing the grain product with a buffer solution (such as MOPS buffer) to create a slurry; and adding a heat-stable enzyme, e.g., an arsenic S-adenosylmethionine methyltransferase, to methylate the inorganic arsenic.

In one embodiment, the subject invention provides a method of reducing inorganic arsenic in a sample, the method comprising: providing the sample containing a certain level of inorganic arsenic; mixing the sample with a buffer solution to create a slurry; and adding a heat-stable enzyme, e.g., an arsenic S-adenosylmethionine methyltransferase, to the slurry to methylate the inorganic arsenic.

In specific embodiments, the sample is a bran composition, bran product or a grain product.

In one embodiment, the subject invention provides a method for treating a bran or grain product, the method comprising mixing the bran or grain product, which contains inorganic arsenic at a level that need to be reduced, with a buffer solution to create a slurry; adding a heat-stable enzyme, e.g., an arsenic S-adenosylmethionine methyltransferase, to the slurry to methylate the inorganic arsenic, and optionally, detecting the inorganic arsenic in the treated bran or grain product to confirm a reduction in the level of inorganic arsenic, preferably, detecting the inorganic arsenic comprising performing a arsenic species analysis.

In one embodiment, the treated bran or grain product comprises a reduced level of inorganic arsenic compared to the untreated bran or grain product.

In certain embodiments, the treated bran or grain product obtained herein can be directly used for consumption or can be processed into other food products.

In one embodiment, the subject invention provides a method for modifying a bran or grain product, the method comprising mixing the bran or grain product with a buffer solution to create a slurry; adding a heat-stable enzyme, e.g., an arsenic S-adenosylmethionine methyltransferase, to the slurry to methylate the inorganic arsenic, and optionally, detecting the inorganic arsenic in the modified bran or grain product to confirm a reduction in the level of inorganic arsenic, preferably, detecting the inorganic arsenic comprising performing a arsenic species analysis.

In one embodiment, the modified bran or grain product comprises a reduced level of inorganic arsenic compared to the unmodified bran or grain product.

In certain embodiments, the modified bran or grain product obtained herein can be directly used for consumption or can be processed into other food products.

In certain embodiments, the method described herein further comprises determining/measuring the level of inorganic arsenic in the bran component before and after the methylation reaction.

In certain embodiments, the method described herein further comprises determining/measuring the level of inorganic arsenic in the bran composition before and after the methylation reaction.

In certain embodiments, the method described herein further comprises determining/measuring the level of inorganic arsenic in the bran product before and after the methylation reaction.

In certain embodiments, the method described herein further comprises determining/measuring the level of inorganic arsenic in the grain product before and after the methylation reaction.

In certain embodiments, the method of the subject invention provides a relatively complete methylation of the inorganic arsenic (e.g., >90%, 91%, 92%, 93%, 94%, 95%, 96%, 97%, 98%, 99%, 99.5% or 99.9%).

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. It will be further understood that terms, such as those defined in commonly used dictionaries, should be interpreted as having a meaning that is consistent with their meaning in the context of the relevant art and/or as otherwise defined herein.

EXAMPLES

Materials and Methods

Reagents

- Commercial rice bran: Now Real Food® Stabilized Rice Bran.
- 70% $HNO_3$:
- 2% $HNO_3$:
- MOPS buffer: 50 mM Mops, 100 mM NaCl, PH 7.5, degassed before use.
- Standards of As(III), As(V), DMAs(V), and MAs(V):
- TCEP: 0.5 M stocking concentration.
- SAM: 100 mM stocking concentration.
- CmArsM: the gene for CmArsM was isolated from the thermophilic red alga Cyanidioschyzon merolae, and the enzyme was purified following expression in *Escherichia coli.*
- Arsenite: 2 mM stocking concentration, arsenic extracted from rice bran.

Acid Extraction of Arsenic for Analysis

- 0.1 g of rice bran was suspended in 1.5 mL of 70% $HNO_3$, the mixture was then incubated at 65° C. for 30 mins.
- 0.1 g of rice bran was suspended in 1.5 mL of 2% $HNO_3$ in an Eppendorf tube. The remaining space in the tube is filled with nitrogen to remove any residual oxygen, minimizing unwanted oxidation reactions, the mixture was then incubated at 65° C. for 24 hours.
- 0.1 g of rice bran was suspended in 1.5 mL of degassed MOPS buffer with 1.33 mM TCEP in an Eppendorf tube. The remaining space in the tube is filled with nitrogen to remove any residual oxygen, minimizing unwanted oxidation reactions, the mixture was then incubated at 65° C. for 24 hours.

Methylation of Inorganic Arsenic

To check CmArsM activity in MOPS buffer, methylation of As(III) was conducted in a system as following at either 37° C. or 65° C.:

- MOPS buffer: 1 mL;
- TCEP: 1 mM;
- SAM: 0.5 mM;
- As(III): 10 UM;
- CmArsM: 1 μM.

To evaluate CmArsM methylation activity in rice bran slurry, the methylation system is listed as following at 65° C.:

- MOPS buffer extract slurry: 1.5 mL;
- TCEP: 0.667 mM;
- SAM: 0.133 mM;
- As(III): either 0.8 μM, extracted directly from rice bran, or 5 μM with an additional amendment of 4.2 μM;
- CmArsM: 1 μM.

Reaction systems were set up in an Eppendorf tube and shaken at 300 rpm.

Total Arsenic Determination by ICP-MS

All assays were performed in triplicate. Total arsenic in the starting material, the extract solution was diluted with HPLC-grade water (Sigma-Aldrich, St. Louis) into 6 mL, arsenic was quantified by inductively coupled mass spectroscopy (ICP-MS). Standard solutions were made in the range of 0.5-50 ppb in 2% nitric acid using an arsenic standard to produce a final $HNO_3$ concentration of 2%. And the pellet was determined by ICP-MS after digestion with 70% $HNO_3$ for 30 min at 70° C., allowed to cool to room temperature and diluted with HPLC-grade water and diluted with HPLC-grade water to produce a final $HNO_3$ concentration of 2%. Then the extraction efficiency was calculated for each method. Results were shown in Table 1.

Arsenic Species Analysis by HPLC-ICP-MS

To analyze arsenic species in extract solution, solution samples were speciated by high pressure liquid chromatography (HPLC) coupled to inductively coupled plasma mass spectroscopy (ICP-MS) using a BioBasic-18 5 μm C18 300 Å reverse-phase column (250 mm×4.6 mm; Thermo Fisher Scientific, Waltham, MA) eluted isocratically with a mobile phase consisting of 3 mM malonic acid and 5% methanol (vol/vol), pH 5.6 (adjusted by tetrabutylammonium hydroxide), with a flow rate of 1 mL min-1 at 25° C.

To analyze arsenic species in the CmArsM-methylated rice bran slurry, samples are first centrifuged at high speed to separate the extract solution from the pellet, then the extract solution was further speciated by HPLC-ICP-MS.

Example 1—Extraction of Arsenic in Rice Bran by Different Methods

Three different methods were applied for extracting arsenic in rice bran as follows:

Extraction method (1): 0.1 g of rice bran was suspended in 1.5 mL of 70% $HNO_3$, and the mixture was then incubated at 65° C. for 30 mins.

Extraction method (2): 0.1 g of rice bran was suspended in 1.5 mL of 2% $HNO_3$. The remaining space in the tube is filled with nitrogen to remove any residual oxygen, minimizing unwanted oxidation reactions. The mixture was then incubated at 65° C. for 24 hours.

Extraction method (3): 0.1 g of rice bran was suspended in 1.5 mL of MOPS buffer with 1.33 mM TCEP. The remaining space in the tube is filled with nitrogen to remove any residual oxygen, minimizing unwanted oxidation reactions. The mixture was then incubated at 65° C. for 24 hours.

All assays were performed in triplicate. Total arsenic in the starting material, the extract solution, and the pellet was determined by ICP-MS after digestion with 70% $HNO_3$, and then the extraction efficiency was calculated for each method. Results were shown in Table 1.

TABLE 1

Comparison of arsenic extraction quantification in commercial rice bran by different methods.

| Extraction | Total Arsenic in starting material (ng) | Arsenic in extract solution (ng) | Residual arsenic in pellet (ng) | Extraction efficiency |
|---|---|---|---|---|
| 70% $HNO_3$ | 95 ± 0.9 | 94.5 ± 0.9 (99%) | 0.8 ± 0.1 (1%) | 99% |

TABLE 1-continued

Comparison of arsenic extraction quantification in commercial rice bran by different methods.

| Extraction | Total Arsenic in starting material (ng) | Arsenic in extract solution (ng) | Residual arsenic in pellet (ng) | Extraction efficiency |
|---|---|---|---|---|
| 2% $HNO_3$ | 103 ± 1.6 | 94.3 ± 1.3 (92%) | 8.6 ± 0.3 (8%) | 92% |
| MOPS buffer | 111 ± 3.7 | 102.1 ± 2.8 (92%) | 9.1 ± 1.0 (8%) | 92% |

The results showed that each of the three methods was relatively equally effective in extracting arsenic from rice bran. Considering that MOPS buffer is the least destructive method among the others, extraction with MOPS buffer was used in subsequent experiments.

Example 2—Arsenic Species Analysis by HPLC-ICP-MS

The following samples were analyzed by HPLC-ICP-MS:

2% $HNO_3$ extract solution obtained in extraction method (2).

MOPS buffer extract solution obtained in extraction method (3).

Standards of As(III), As(V), DMAs(V), and MAs(V).

Results were shown in FIG. 1, indicating that inorganic arsenite (As(III)) is the predominant form of arsenic in rice bran.

Arsenic species quantification in MOPS buffer extract solution (in triplicate) was shown in Table 2, indicating that nearly all arsenic in rice bran are inorganic arsenic, i.e., As(III) and As(V).

TABLE 2

Arsenic species in MOPS buffer extract solution of commercial rice bran.

| Total Arsenic (ng) | Arsenic in extract solution (ng): As (III) | As (V) | DMAs (V) | MAs (V) | Species sum in solution (ng) | Soluble arsenic extraction rate[a] |
|---|---|---|---|---|---|---|
| 111.2 ± 3.7 | 75.4 ± 1.9 (74%) | 19.6 ± 0.5 (19%) | 5.3 ± 0.5 (5%) | 1.7 ± 0.3 (2%) | 102.1 ± 1 | 92% ± 2% |

[a]Soluble extraction efficiency is the quantity of soluble arsenic removed by the extraction divided by the total arsenic in rice bran, multiplied by 100.

Example 3—Methylation of Inorganic Arsenic at Different Temperatures

Figure 2:
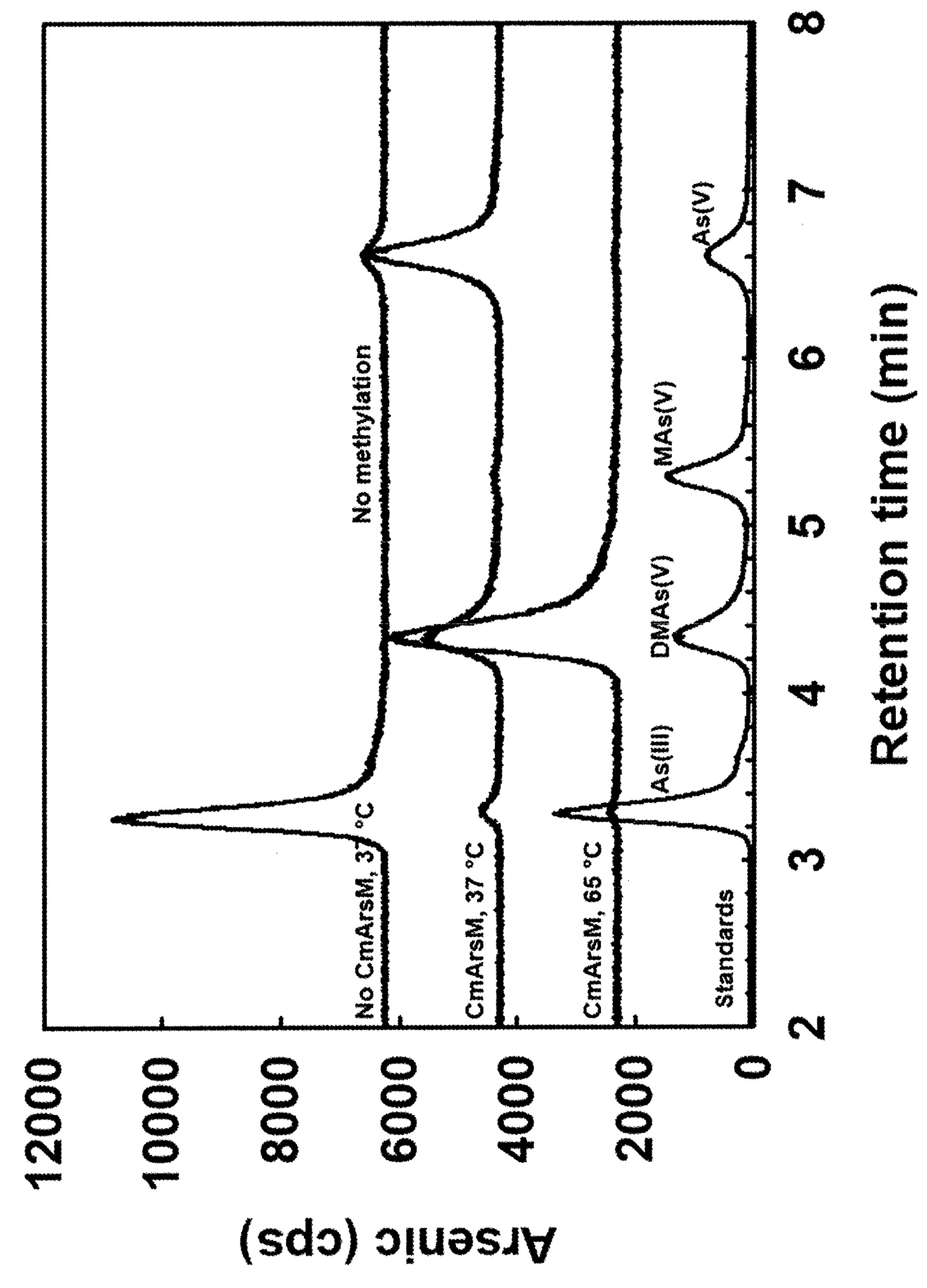
FIG. 2 shows methylation of inorganic arsenic in rice bran in MOPS buffer at different temperatures.

Methylation of inorganic arsenic was conducted in a system as shown in Table 3 at 37° C. and 65° C., respectively. A 2 mM As(III) stock solution was used for checking CmArsM activity in MOPS buffer. Reaction mixtures were then analyzed by HPLC-ICP-MS. As shown in FIG. 2, CmArsM completely methylated inorganic arsenic in MOPS buffer to DMAs(V) at 65° C., indicating that CmArsM is a heat-resistant protein that works much better at a higher temperature.

TABLE 3

Reaction system for methylation of inorganic arsenic at different temperatures.

| Reactant | Final Concentration |
|---|---|
| MOPS buffer | 1 mL |
| TCEP | 1 mM |
| SAM | 0.5 mM |
| As(III) | 10 μM |
| CmArsM | 1 μM |

Example 4—Methylation of Increased Inorganic Arsenic in Rice Bran

The total arsenic in the commercial rice bran tested herein, i.e., Now Real Food® Stabilized Rice Bran, is 111.24 ng per 0.1 g rice bran, equivalently to around 1.112 mg/kg. Comparison shows that rice bran from some foreign countries has more inorganic arsenic than the commercial rice bran tested herein. For example, rice from China contains about 2.65 to 6.24 mg/kg inorganic arsenic (Sun et al. *J. Environ Sci Technol,* 2008 Oct. 1; 42 (19): 7542-6).

Figure 4:
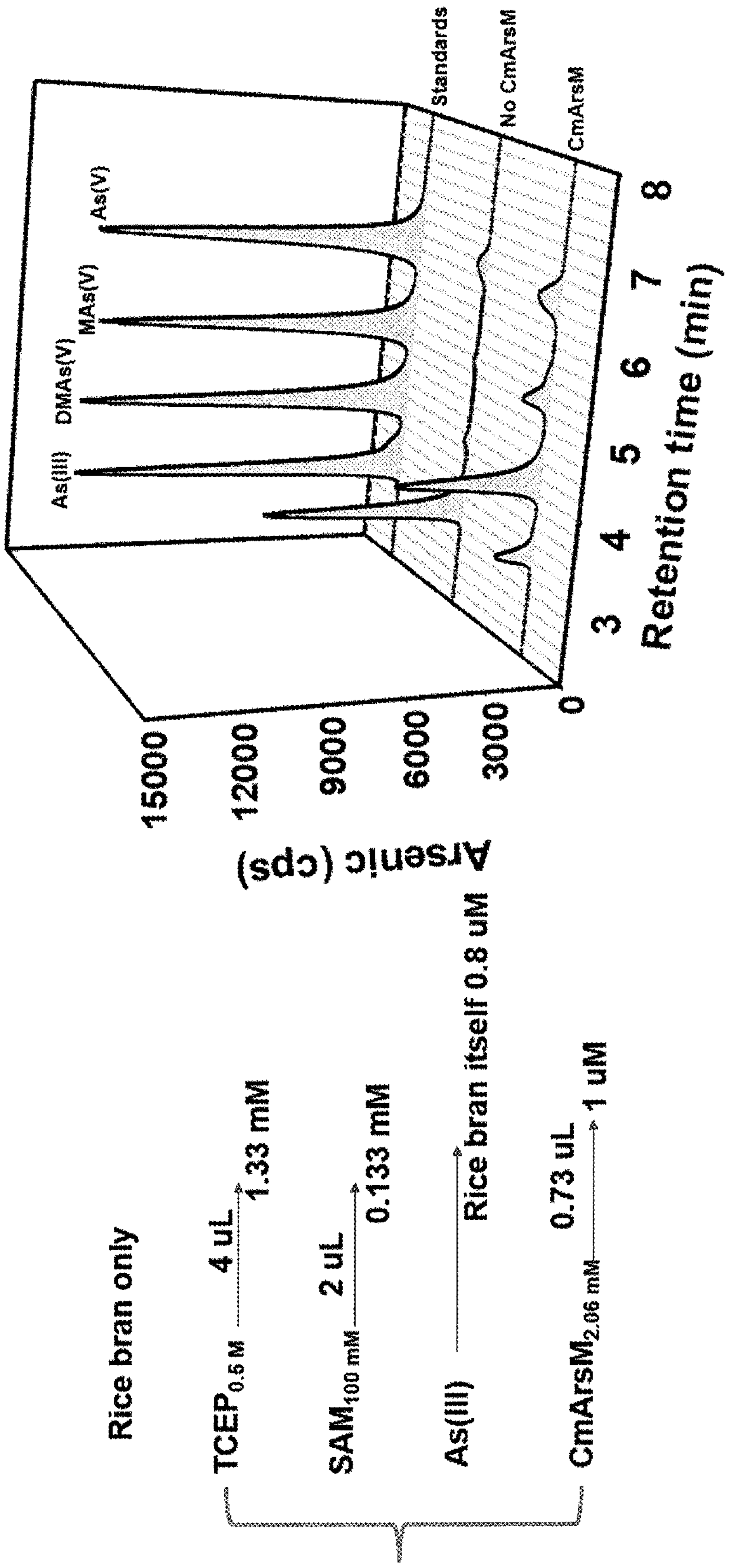
FIG. 4 shows methylation of inorganic arsenic in rice bran.

To demonstrate that CmArsM can effectively methylate arsenic in US commercial rice bran, the Now Real Food® Stabilized Rice Bran was tested at a total 0.8 μM of arsenite (As(III)). Methylation of inorganic arsenic was conducted for the rice bran only at 65° C. in a system as shown in Table 3, and the reaction mixture was then analyzed by HPLC-ICP-MS. Results were shown in FIG. 4, which indicated that CmArsM methylated 0.8 μM arsenite to DMAs(V), and that CmArsM can methylate the inorganic arsenic in the commercial rice bran.

TABLE 4

Reaction system for methylation of inorganic arsenic in rice bran only.

| Total volume | Reactant | Final Concentration |
|---|---|---|
| 1.5 mL | TCEP (0.5M) | 1.33 mM |
| | SAM (100 mM) | 0.133 mM |
| | As(III) | rice bran itself (0.8 μM) |
| | CmArsM (2.06 mM) | 1 μM |

Figure 3:
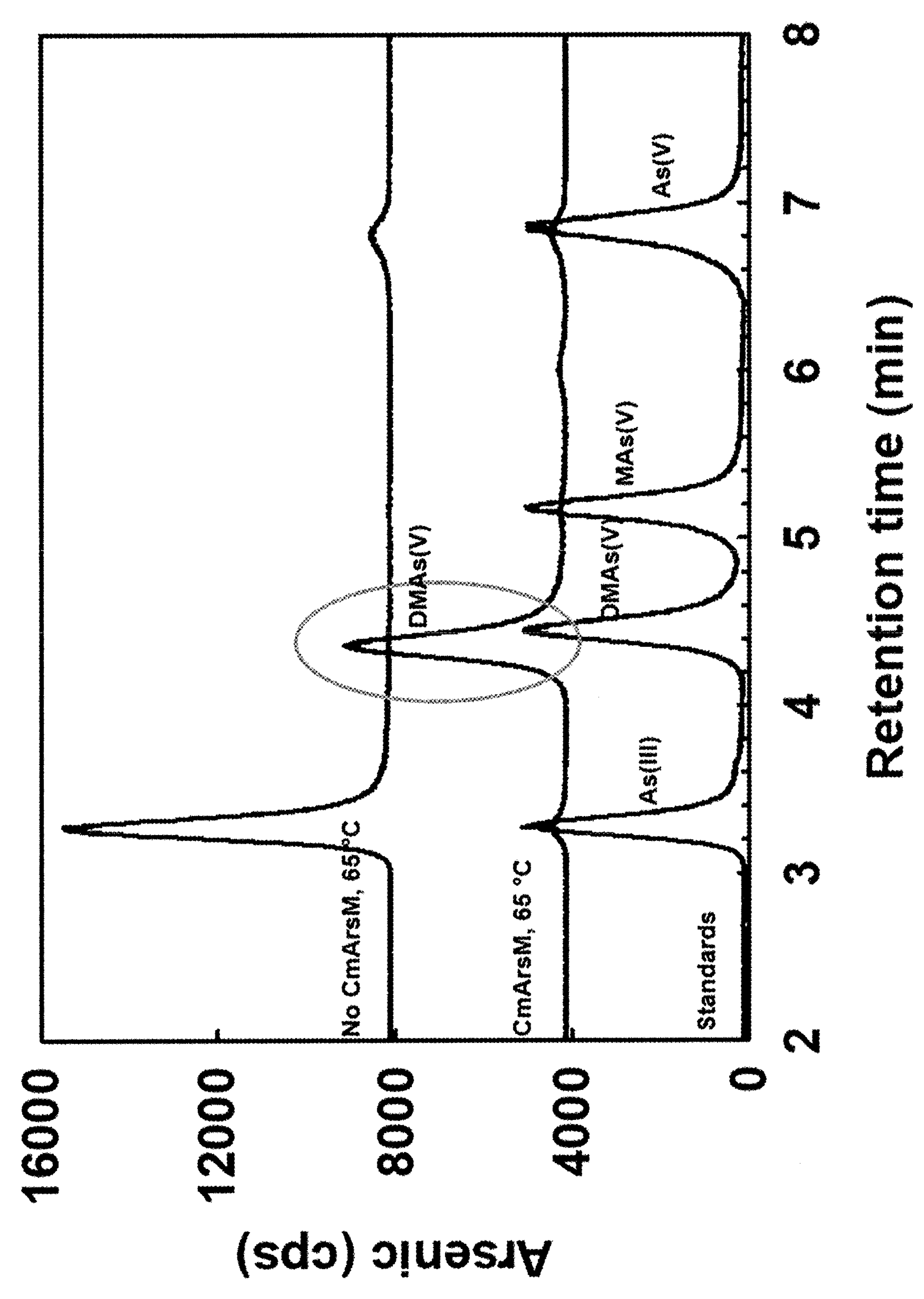
FIG. 3 shows methylation of increased inorganic arsenic in rice bran.

To demonstrate that CmArsM can methylate as much arsenic as found in foreign rice, extra arsenite (As(III)) was added to the commercial rice bran to obtain a total 3.75 mg/kg (5 μM) of arsenite (As(III)). Methylation of inorganic arsenic was conducted for the amended rice bran with increased inorganic arsenic at 65° C. in a system as shown in Table 5, and the reaction mixture was then analyzed by HPLC-ICP-MS. Results were shown in FIG. 3, which indicated that CmArsM completely methylated 5 μM arsenite to DMAs(V), and that CmArsM can methylate high amounts of inorganic arsenic.

TABLE 5

Reaction system for methylation of increased inorganic arsenic in rice bran.

| Total volume | Reactant | Final Concentration |
|---|---|---|
| 1.5 mL | TCEP (0.5M) | 0.667 mM |
| | SAM (100 mM) | 0.133 mM |
| | As(III) | rice bran (0.8 μM) + extra 4.2 μM As(III) → 5 μM |
| | CmArsM (2.06 mM) | 1 μM |

It has been demonstrated by the above examples that the inorganic arsenic in stabilized rice bran can be quantitatively transformed into DMAs by enzymatic treatment with the heat-stable protein CmArsM, an As(III) S-adenosylmethionine methyltransferase enzyme. Results have shown that >90% of the inorganic arsenic was converted into DMAs after overnight treatment of commercial stabilized rice bran with purified CmArsM at a high temperature, suggesting that the amount of inorganic arsenic in rice bran can be nearly completely removed by methylation.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. These examples should not be construed as limiting. In addition, any elements or limitations of any invention or embodiment thereof disclosed herein can be combined with any and/or all other elements or limitations (individually or in any combination) or any other invention or embodiment thereof disclosed herein, and all such combinations are contemplated within the scope of the invention without limitation thereto.

What is claimed is:

1. A detoxified bran composition comprising a detoxified bran component with a more than 90% reduction in inorganic arsenic compared to an undetoxified bran component, the detoxified bran component having inorganic arsenic up to 0.2 mg/kg by weight, wherein the detoxified bran component comprises dimethylarsenate (DMA), and wherein the more than 90% of the inorganic arsenic present in the bran is converted into DMA.

2. The detoxified bran composition of claim 1, which has a level of inorganic arsenic reduced by at least about 95% relative to an undetoxified bran composition.

3. The detoxified bran composition of claim 1, the detoxified bran component being selected from a rice bran component, corn bran component, wheat bran component, oat bran component, barley bran component, rye bran component, and millet bran component.

4. The detoxified bran composition of claim 1, the detoxified bran component being at least about 60% of the detoxified bran composition by weight.

5. A grain product comprising the detoxified bran composition of claim 1.

6. The grain product of claim 5, further comprising at least one other component and/or other ingredient.

7. The grain product of claim 6, the other component being selected from an endosperm component and a germ component.

8. The grain product of claim 6, the other ingredient being selected from flavorings, oils, emulsifiers, preservatives, colorants, texturizers, and functional additives.

9. A food product that is made from the grain product of claim 5.

10. The food product of claim 9, the food product being a bakery product selected from cookies, crackers, pizza crusts, pie crusts, breads, bagels, pretzels, brownies, muffins, waffles, pastries, cakes, quickbreads, sweet rolls, donuts, fruit and grain bars, tortillas, and parbaked bakery products.

11. The detoxified bran composition of claim 1, the detoxified bran component having inorganic arsenic up to about 0.1 mg/kg by weight.

12. The food product of claim 9, the food product being un-baked products, frozen products, confectionery, dairy products, cream-based sauces and soups, dressings and dips, beverages, spice emulsions, baby food, dietary supplements, or animal foods.

13. The food product of claim 9, the food product comprising one or more additives selected from phytochemicals, vitamins, minerals, fatty acids, oils, amino acids, and probiotics.

14. The food product of claim 9, the food product further comprising glycerol, sorbitol, enzyme lignin, insoluble fiber, and/or soluble fiber.

15. The grain product of claim 5, the grain product being a dry product containing up to about 2% by weight of water or other solvent.

16. The grain product of claim 5, the grain product being ground to have an average particle size in the range of about 100 μm to 700 μm.

17. The grain product of claim 8, the functional additives being selected from probiotics, prebiotics, omega-3 fatty acids, antioxidants, and minerals.

18. The detoxified bran composition of claim 1, the detoxified bran component having inorganic arsenic up to about 0.05 mg/kg by weight.

19. A detoxified bran composition comprising a detoxified bran component having inorganic arsenic up to about 0.1 mg/kg by weight, wherein the detoxified bran component comprises dimethylarsenate (DMA).

20. A grain product comprising the detoxified bran composition of claim 19.

* * * * *